United States Patent Office.

WILLIAM H. WALLACK, OF CORUNNA, INDIANA.

Letters Patent No. 93,143, dated July 27, 1869.

IMPROVED LINIMENT.

The Schedule referred to in these Letters Patent and making part of the same.

*To all whom it may concern:*

Be it known that I, WILLIAM H. WALLACK, of Corunna, in the county of DeKalb, and State of Indiana, have invented certain new and useful Improvements in Medical Compounds for Liniment, &c.; and I do hereby declare that the following is a full, clear, and exact description thereof.

To enable others skilled in the art to construct and use my invention, I will proceed to describe it.

My invention relates to medical compounds; and consists in a novel combination of various ingredients, possessing useful medical properties, by which I produce a new and useful liniment, specially applicable to all diseases requiring a counter-irritant.

In making my liniment, I take the following ingredients, in about the proportions set opposite to each, and thoroughly mix them:

Alcohol, one quart.
Oil of spike, one-half ounce.
Oil of stone, one-half ounce.
Tincture of iodine, one-half ounce.
Aqua ammonia, one-half ounce.
Gum-camphor, one-half ounce.
Spirits of turpentine, one ounce.
Oil of amber, one ounce.
Tincture of myrrh, one ounce.
Oil of sassafras, one ounce.
Chloroform, one ounce.
Oil of cedar, two ounces.
Oil of origanum, two ounces.

The liniment made by mixing the above ingredients, I have found to be an excellent remedy for the following complaints: rheumatism, sprains, lame back, headache, pleurisy, burns, &c.; and also useful in removing callous or any preternatural hardening of the skin, &c.

Having thus described my invention,

What I claim, is—

A medical compound or liniment, composed of the ingredients substantially as herein described, as a remedy for rheumatism, sprains, burns, &c., as set forth.

WILLIAM H. WALLACK.

Witnesses:
WILLIAM C. SHOOK,
I. H. SHOOK.